United States Patent
Orlando

Patent Number: 5,724,469
Date of Patent: Mar. 3, 1998

[54] ADJUSTABLE FIBER STORAGE PLATE

[75] Inventor: Stephen Orlando, Longboat Key, Fla.

[73] Assignee: Ortronics, Inc., Pawcatuck, Conn.

[21] Appl. No.: 590,371

[22] Filed: Jan. 26, 1996

[51] Int. Cl.[6] .................................................. G02B 6/09
[52] U.S. Cl. .................................................. 385/135
[58] Field of Search .................................. 385/135, 138, 385/147

[56] References Cited

U.S. PATENT DOCUMENTS

| | | | |
|---|---|---|---|
| 4,687,289 | 8/1987 | DeSanti | 350/96.2 |
| 4,717,231 | 1/1988 | Dewez et al. | 350/96.2 |
| 4,722,585 | 2/1988 | Boyer | 385/135 |
| 4,840,449 | 6/1989 | Ghandeharizadeh | 350/96.2 |
| 4,900,123 | 2/1990 | Barlow et al | 350/96.2 |
| 4,975,510 | 12/1990 | Davila et al. | 385/135 |
| 4,976,510 | 12/1990 | Davila et al. | 350/96.2 |

*Primary Examiner*—Akim E. Ullah
*Attorney, Agent, or Firm*—St.Onge Steward Johnston & Reens

[57] ABSTRACT

An adjustable fiber storage plate for optical or composite fibers has a commodious open plate design that comprises a base divided into two sections releasably held together; a cylindrical ring extending radially outward from the base, with half the ring extending from one section and half from the other, wherein, when the sections are together, the ring forms a circle having a radius at least equal to the minimum bend radius for an optical fiber; and at least one fiber fastening means in each section, attached to the ring and to the base plate so that a fiber can be held in position around the ring and adjacent to the base. The sections can be mounted together so that the fiber is stored in a circular configuration, or apart, such that the fiber is stored in an oval configuration. Placement of the sections at different distances varies the storage capacity of the plate. Typical plates have, per section, two fastening means that are latching clips extending radially outward from and hinged to the ring; the clips each have an arm that engages with a catch and a catch assist member on the base to secure the fibers.

18 Claims, 3 Drawing Sheets

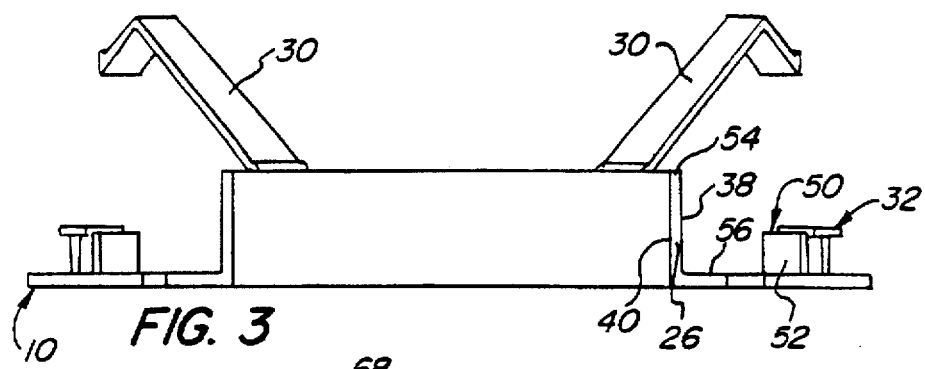
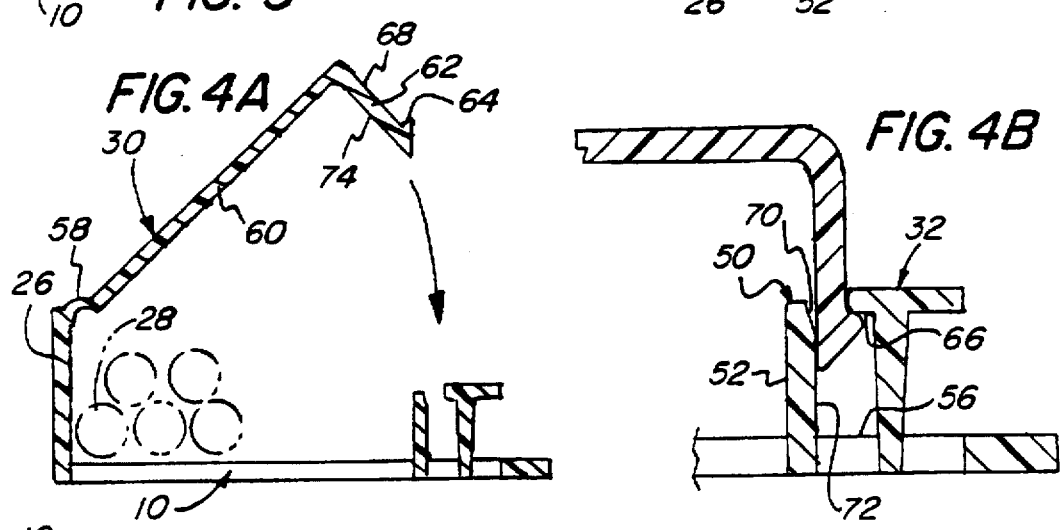
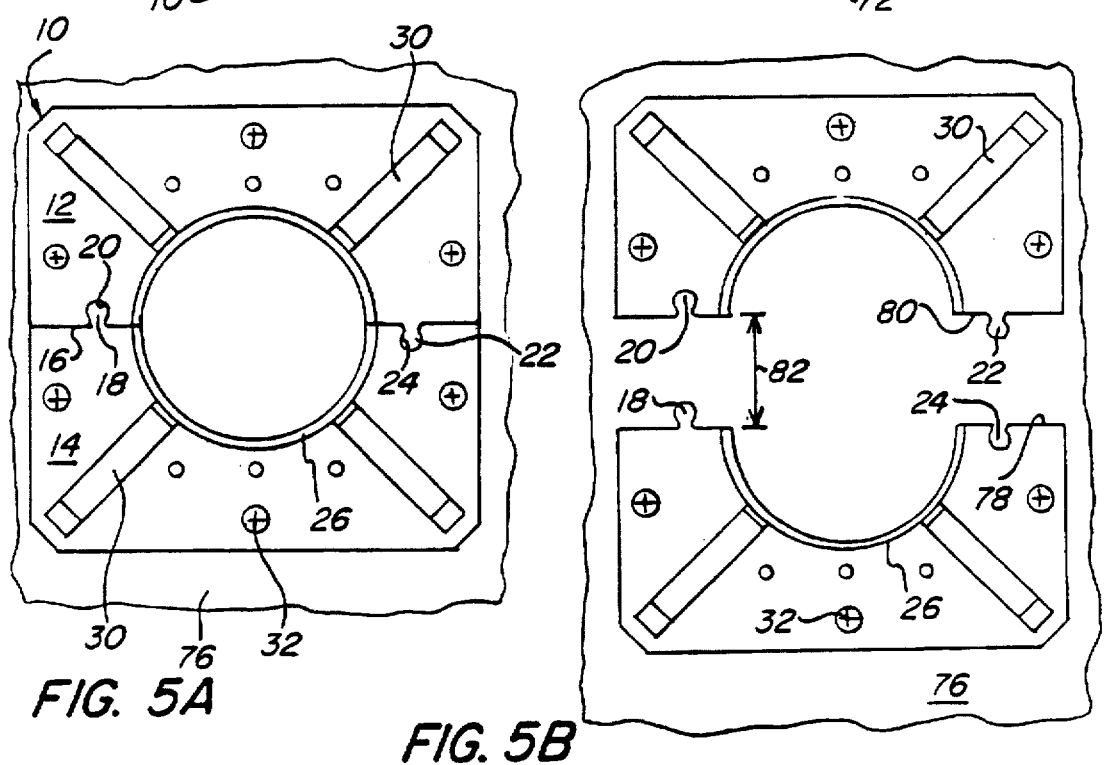

ADJUSTABLE FIBER STORAGE PLATE

DESCRIPTION

TECHNICAL FIELD

This invention relates to a fiber storage plate for optical fiber cables or composite cables having both metal wires and optical fibers.

Structured cable systems for the delivery of communication services must provide for cable interconnection and distribution whether the system is simple or complex. Where the system is complex as in modern commercial buildings, the wiring infrastructure supports a wide variety of services. Horizontal and vertical routing of cables which often contain a plurality of fibers and/or wires, and defined routing of individual cables and their interconnections are essential aspects of the system. With the burgeoning telecommunications required by most business, government, and education organizations, it is preferable that this cable routing be as flexible as possible so that changes can be accommodated efficiently, reliably, and economically, and maintenance and repairs handled at a reasonable cost.

Optical fibers are often an integral part of modern structured cable systems because the fibers provide a transmission medium for wide bandwith lightwave communication systems and are small in diameter. However, though very useful, optical fibers are typically brittle and have transmission characteristics that are impaired by bending beyond a prescribed minimum bend radius. Consequently, it is necessary to use special handling techniques when these fibers are incorporated in cable systems.

Where systems include optical fibers and have a large number of interconnections, the fibers must be spliced to make the interconnections and accommodate interconnection changes demanded over time. Interconnection splices are usually contained in enclosures designed to provide a reservoir of slack fiber so that splicing changes can be made. The enclosures must maintain the required optical fiber transmission characteristics and the integrity of a plurality of fibers.

BACKGROUND OF THE INVENTION

A number of devices have been suggested for the cable outlets, interconnections and distribution boxes and supports for wiring systems having optical fibers or composites containing both metal, e.g., copper, and optical fibers. Preferred designs provide for storage of some slack fiber so that sufficient fiber length is provided for access to the various fiber connecting devices and for changes to the system. The minimum bend radius for stored optical fibers must be maintained, and so the various contrivances account for this geometrical requirement in different ways.

In U.S. Pat. No. 4,976,510, Davila, et al., disclosed a wall communications outlet having a backplate with a central circular opening and sets of side walls about the opening that acted as a storage area for the optical fibers or copper wires. Though a variety of connector sleeves could be fitted in the connector panel, the number and variety of cables that could be accommodated and the overall capacity of the outlet was limited by the dimensions of the box. Indeed, to house the necessary cables, connecting devices, and spare loops of fibers, boxes of the Davila, et al., type are often bulky.

Dewez, et al., provided an optical fiber interconnecting and distributing box that had reduced dimensions by organizing and compartmentalizing the fiber arrays and providing movable panels within the box (U.S. Pat. No. 4,717,231). In U.S. Pat. No. 4,840,449, Ghandeharizadeh suggested a more systematic organizer that had cylinders and a splice tray in the box. DeSanti suggested a splice organizer serving a similar purpose but having splice receiving grooves for the cables and the fiber tray assembly configured differently (U.S. Pat. No. 4,687,289). Barlow and Cooper devised a more elaborate apparatus that housed a connector panel, a (slidable) drawer having a splice tray, storage cassettes, and a fiber and pigtail take-up enclosure (U.S. Pat. No. 4,900,123). Because of their organizational features, all of these boxes had certain advantages during maintenance and repair operations over others designed for the same purpose, but cable storage was constricted by box geometry.

Boyer disclosed a spool structure as an alternative optical fiber connection support in U.S. Pat. No. 4,722,585. Circular or oblong, the interior support shape was defined by central cylinders. Stored wound fibers were disposed around the cylinders and held in place by means of protruding tabs; an outer ring was used for slack lengths of fiber-carriers and an inner ring, for fibers from the carriers. The simplicity of the design enabled the supports to be maniupulated individually, but ring design limited capacity.

It would be desirable to have fiber storage devices that are commodious and versatile.

DISCLOSURE OF THE INVENTION

It is an object of the invention to provide a fiber storage plate for fiber optic, metal, and multimedia cables.

It is another object of the invention to provide a fiber storage plate that is extremely easy to use and economical to manufacture.

It is further object of the invention to provide a fiber storage plate that can be adjusted to provide for the storage of different lengths of fibers.

These and other objects are achieved by the present invention, which provides a fiber storage plate comprising a flat base, a cylindrical ring extending outward from the base and at least two fiber fastening means attached to the cylindrical ring and to the base so that a fiber loop or loops can be held in position around the ring and adjacent to the base. The ring has a radius at least equal to the minimum bend radius of an optical fiber. The base typically further comprises a mounting means such as screws or double-sided sticky tape. In preferred embodiments, the fastening means comprises a latching clip on the ring that engages with a catch on the base, and there are two fastening means on each side of the plate extending radially from the ring. The base further comprises openings for lighting in some embodiments.

The base comprises two sections divided through the center of the cylindrical ring into two half sections that are releasably held together by snap-fit engagement of a tab on one section with a corresponding slot on the other section. When the sections are held and mounted together, fibers are secured around the ring by the fastening means in a circular configuration. In an alternate embodiment, the sections may be mounted apart with the open ends of the ring halves aligned; the fibers are secured around the two ring halves in an oval configuration in this embodiment. By varying the distance between the sections, the length of stored fiber can thereby be adjusted.

Other objects, aspects and features of the present invention in addition to those mentioned above will be pointed out in or will be understood from the following detailed description provided in conjunction with the accompanying drawings.

BRIEF EXPLANATION OF THE FIGURE

FIG. 3 is a side view of a plate half section as seen from the inside center of the plate, showing two fiber latching clips in open positions.

FIGS. 4A and 4B are cross-sectional plate views showing a latching clip in an open (FIG. 4A) and in a closed (FIG. 4B) position.

FIGS. 5A and 5B are top views of a plate in a configuration having the halves together (FIG. 5A) or a distance apart for the accommodation of longer stored fiber (FIG. 5B).

BEST MODES FOR CARRYING OUT THE INVENTION

As illustrated in FIGS. 1 to 6, this invention describes an adjustable fiber storage plate typically comprising two half sections that can be installed at different distances from one another for accommodation of fibers of various lengths.

Figure 1:
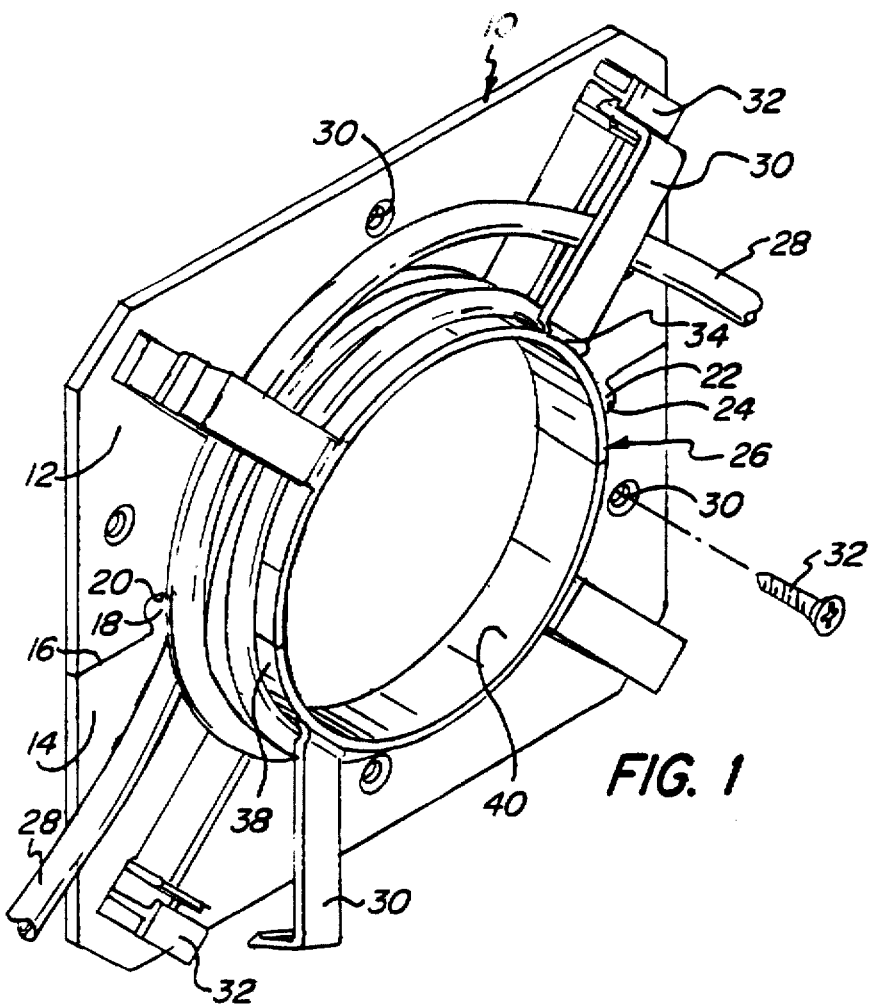
FIG. 1 is a drawing of a front perspective view of a fiber storage plate of the invention having two half sections snapped together to form a fiber storage ring, with a length of fiber held in position by latching clips in a circular configuration around the ring and adjacent to the base.

With reference to FIG. 1, the basic structure of a typical plate comprises a base 10, a cylindrical ring 26 extending outward from the base, and at least two fiber fastening means such as latching clip 30 which engages with catch 32 in the base to secure fiber 28 in place around the ring. Base 10 is divided into two sections 12 and 13 releasably held together along interface 16 by insertion of tab 18 of section 14 into correspondingly sized slot 20 of section 12, and tab 22 of section 12 into slot 24 of section 14 sized to engage one another and snap together. The Figures depict one flanged finger-shaped tab and a correspondingly sized slot per plate section, but other shaped tabs and slots, or two or more tabs may be employed in embodiments not illustrated. Moreover, though the illustrations employ tabs snapped in slots to hold the plate sections together, snap-fit retaining fingers, intermeshed flanges, notched mating structures or other functionally equivalent designs used for modular part assembly may be employed, and some embodiments are simply sized so that the sections can be mounted together. The tab/slot snap-fit shown is preferred because of its simplicity, economy of manufacture, and ease of use.

Figure 6:
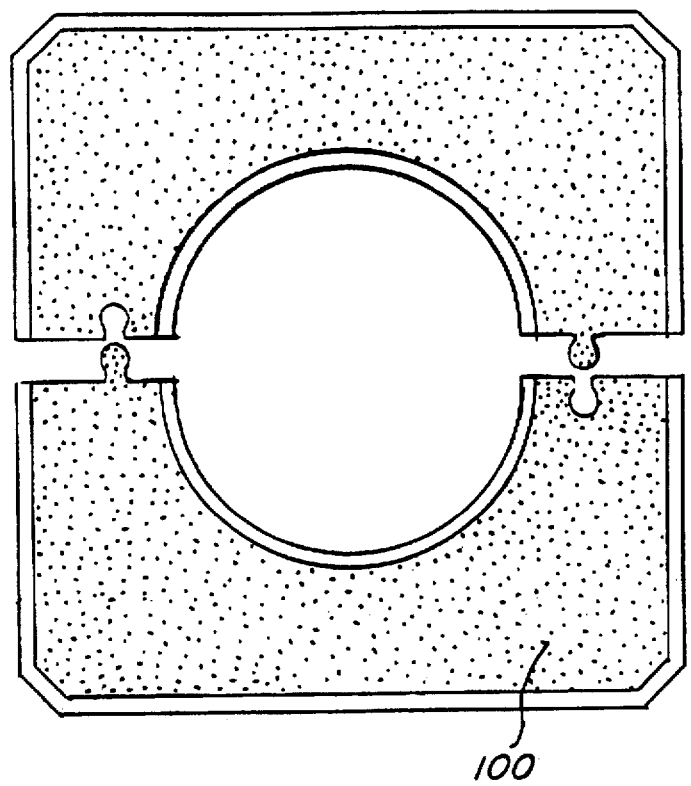
FIG. 6 is a bottom view of two plate half sections illustrating an embodiment having plate mounting by means of an adhesive or double sticky tape rather than the screws shown in FIG. 1.

Base 10 can be plastic, metal or any other material or material mixtures known to those skilled in the art. Plastic is used in most embodiments. The plate is sized in preferred embodiments to conveniently fit multimedia systems, and the base is a square about 10 to 15 cm on a side in typical embodiments. In one embodiment, base 10 is about 12.9 cm on a side and 1.9 mm thick. It has three screw holes 30 in each section (12 and 14) for mounting using screws 32 that are positioned for secure mounting of the plate sections 20° and 90° from the center of the line defined by interface 16. Other mounting means for outlets, connection boxes, splice organizers and the like may be employed. Another embodiment, for example, is illustrated in FIG. 6. The sections have no screw holes and are mounted, instead, with double-sided sticky tape or adhesives (100).

Extending outward from the base 10 is cylindrical ring 26, which in preferred embodiments defines the center edge of base sections 12 and 14 as shown in the Figure. The fibers 28 are arranged either entering from the side as illustrated, or threaded through the ring (not shown). It is an advantage of the invention that the plate can be mounted on the wall to form a reel. The ring has a radius at least equal to the minimum bend radius of an optical fiber, e.g., the Electronics Industries Association (EIA) minimum bend radius such as TIA/EIA-569A, to ensure that the transmission performance characteristics of optical fiber 28 or fibers stored around the ring in the plate is maintained. A minimum inner radius of 2 centimeters is sufficient for this purpose in some embodiments, but preferred embodiments have a minimum inner radius of at least about 3 centimeters. In preferred embodiments, the radius ranges from about 3 to about 5 centimeters. In one embodiment, the ring radius is about 3.5 centimeters to outer wall 38 of ring 26 (and about 3.3 centimeters to inner wall 40).

As summarized above, when sections 12 and 14 are mounted together, fiber 28 is stored on the plate using fiber fastening means. In the Figure depiction, fiber 28 is secured around ring 26 and adjacent to base 10 by engagement of latching clip 30 extending radially outward from the ring with catch 32 on the base, but any other functionally similar fiber fastening means such as a hook, elastic band, or the like can be employed in other embodiments (not shown). The clip and catch means illustrated in the Figure is preferred in many embodiments for ease of use and manufacture. As will be discussed below, the latching clip and catch are designed for quick release and closure so that fiber can be quickly installed or replaced. There is at least one, preferably two, fiber fastening means per base section. In the Figure there are two latching clips 30 and two catches 32 in both sections 12 and 14. For illustrative purposes, latching clips 30 are closed in section 12 and open in section 14.

Figure 2:
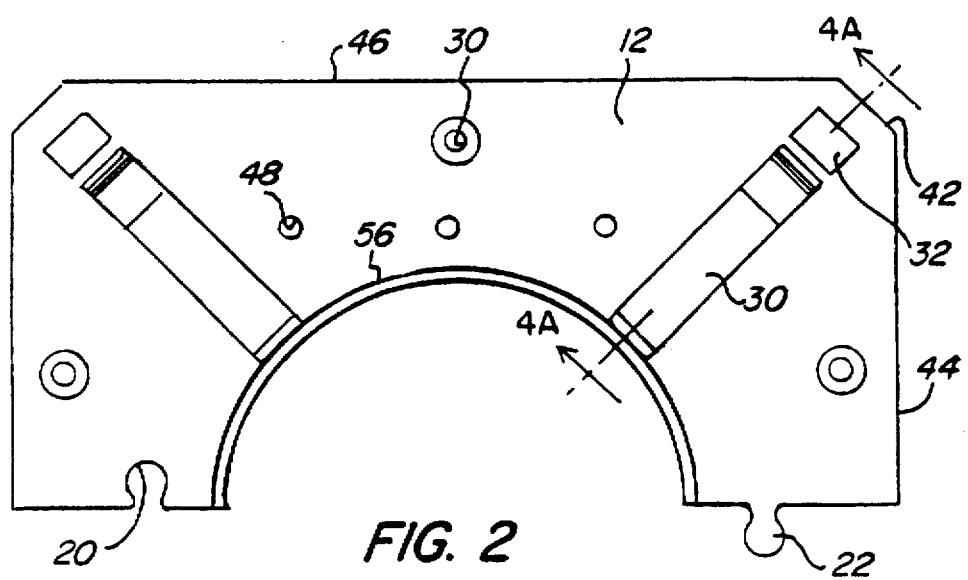
FIG. 2 is a top view of a plate half section.

The top view of a plate section half in FIG. 2 shows an important advantage of the invention. Preferred fiber storage plates are formed by releasably joining two identical half sections. To aid in the visualization of this, the section half of FIG. 2 is identified as section 12 of FIG. 1. The section is oriented to show that the plate of FIG. 1 is assembled from sections 12 and 14 by snapping tab 18 into slot 20 and tab 22 into slot 24 as described above. However, sections 12 and 14 are identical parts, so that FIG. 2 as labelled represents section 12 of FIG. 1 right side up, but tab and slot could be relabelled to represent section 14 upside down. Because the section halves are identical in preferred embodiments, the fiber storage plate of the invention is very easy to install and economical to manufacture.

FIG. 2 also illustrates other advantages of preferred embodiments. The corner of the section is blunted to form corner edge surface 42 instead of a right angle. This feature eliminates sharp edges that might injure workers installing the plates and that might break off during manufacture and shipping, and makes the plates easier to install in confined spaces. In one embodiment, edge surface 42 is about 1.1 centimeters, and flanking sides 44 and 46 are about 5.6 and 11.3 centimeters, respectively.

Also shown are lighting holes 48, which number 3 in the embodiment shown. These accommodate, for example, single gang or double gang lighting in optional embodiments where such lighting is desired.

FIG. 3 shows a side view of a plate half section from the perspective of the inside center of the plate. No fibers are stored in the Figure, and latching clips 30 are open. In the preferred plate embodiment shown, cylindrical ring 26 is perpendicular to base 10. This allows for maximal fiber storage around the ring. However, in other embodiments not shown, ring 26 is angled slightly.

The Figure shows catch assist member 50 proximal to catch 32 attached to base 10. The space around the ring delimited horizontally by the distance between surface 52 of catch assist member 50 and exterior ring surface 38, and vertically by the distance between top ring surface 54 and top base surface 56 is generously proportioned so that a thick bunch of fibers can be stored and secured on the plate. In one embodiment, this circular storage space is about 3.6 centimeters wide and about 1.5 centimeters deep.

Moreover, an advantage of the invention over many prior art storage devices is that the fiber storage space is not enclosed. Sidewalls are not needed. The overall plate is much larger than the space around the ring under the latching clips, and can accommodate fibers that have connection devices and splices, including interconnected fibers that have multiple connection devices. These devices can be positioned on base 10 away from fastening clips 30 when the fibers are installed, e.g., in the area between ring portion 56 and plate edge 46 of FIG. 2. The open plate design can thus house a number and variety of fibers and is much more flexible in this regard than previously described outlet and distributing boxes discussed above. And open plates are less bulky than boxes, facilitating installation, transportation, and storage.

FIGS. 4A and 4B illustrate a preferred fastening means to secure stored fibers 28 disposed around ring 26 and adjacent to base 10. Ring 26 is perpendicular to base 10. In FIG. 4A, latching clip 30 is in the open position, extending radially out from the ring. Pivot portion 58 attaches arm member 60 to ring 26 by means of an integrally molded hinge. The Figure illustrates an embodiment wherein ring 26 and latching clip 30 are fabricated out of a single piece of material, preferably a plastic that has overall rigidity, but exhibits some flexibility when thin-structured. Pivot portion 58 is tapered somewhat to form the integrally molded hinge. Though the hinge design illustrated is preferred for ease of manufacture and use, any comparable hinge design linking arm member 60 to ring 26 can suffice in the practice of the invention, including, but not limited to, metal pins, plastic pins, and living hinges, and other types of fastening means not shown such as elastic bands or hooks may be employed. In one embodiment, the overall length of arm member 60 and pivot portion 58 is about 4 centimeters.

To secure fibers 28, latching clip 30 is pushed downwards towards base 10 in the direction of the arrow. As shown in FIG. 4A, when in a closed position, clip end portion 62 engages with catch 32 and catch assist member 50. At the tip of clip end portion 62, outer wall 68 flares out into triangular shape, providing tip surface 64 for engagement with catch surface 66 for latching the clip to catch 32 attached to base 10. Catch assist member 50 is positioned near catch 32 so that surface 74 of arm end portion 62 comes to rest against surface 72 of catch assist member 50 to further hold latching clip 30 to catch 32.

The fastening mechanism is enhanced by the design of catch assist member 50. Surface 72 of catch assist member 50, parallel to base surface 56, tapers at the top to form surface 70. The fastening means is closed by simply pressing latching clip 30 down to engage catch 32. During this movement, as latching clip 30 descends, taper surface 70 helps ease flat clip surface 74 into position so that the clip can be held by catch 32. Conversely, to open the latching clip, arm member 60 is simply depressed. This movement, clip end portion 62 is forced downwards to base surface 56, releasing the engagement of surface 64 in the tip with surface 66 of the catch. Because of the motion, elasticity of pivot 58 and the structure of taper surface 70, the clip pops open. The overall fastening means is thus extremely simple in design, use, and manufacture. It is also an improvement over fingers used to contain wires in prior art storage devices described above because the fastening means of the inventon actually secure the fibers to the ring.

FIGS. 5A and 5B further illustrates the flexibility of the of the invention by illustrating how the plate can be adjusted and its capacity, varied. FIG. 5A shows a plate like that illustrated in FIG. 1. Identical sections 12 and 14 are snapped together with tab 18 in slot 20 and tab 22 in slot 24. Plate 10 is mounted on substrate 76 using six screws 32. So arranged, fibers can be secured around ring 26 using latching clips 30 in a circular configuration.

FIG. 5B shows an alternate installation of the plate. In this embodiment, the sections are mounted apart, such that open ends of the ring 26 on each section are aligned. Section surfaces 78 having notches and 80 having tabs are arranged parallel to one another. In this arrangement of sections, fibers can be secured around ring using latching clips 30 in an oval configuration. By varying the distance between the sections, different lengths of stored fiber can be accommodated. Storage can be customized at the time of installation and changed as desired afterwards. Fibers can be restrained radially and axially.

The adjustable fiber storage plate of the invention thus offers ease of installation, simplicity of use, versatility of storage, and economy of manufacture.

The above description is for the purpose of illustrating and not limiting the present invention, and teaching the person of ordinary skill in the art how to practice it. The description is not intended to detail all those obvious modifications and variations of it which will become apparent to the skilled worker upon reading the description. It is intended, however, that all such obvious modifications and variations be included within the scope of the present invention as defined in the appended claims.

The above-cited patents are hereby incorporated herein in their entireties by reference.

I claim:

1. A fiber storage plate comprising a base, a portion of a stationary cylindrical ring extending along an axis outward from the base, wherein the ring portion has a radius of curvature at least equal to the minimum bend radius of an optical fiber, and a releasable fiber capturing means extending from an axially outward position on the cylindrical ring to the base plate so as to form a radially extending and axially closed fiber storage space wherein fiber can be held in position around the ring portion and adjacent to the base.

2. A fiber storage plate according to claim 1 wherein the fastening means is movably affixed to the ring portion and releasably engages the base.

3. A fiber storage plate according to claim 2 wherein the fastening means comprises a catch mounted to the base and a latching clip movably affixed to the ring portion and wherein said latching clip extends radially outward from the ring and has an arm that engages with said catch and a catch assist member on the base for assisting in the retention of said arm.

4. A fiber storage plate according to claim 1 wherein the base comprises two matching sections, each section having a said ring portion which match to form a cylindrical shape when the base sections are placed in matching relationship.

5. A fiber storage plate according to claim 4 wherein the two sections are releasably held together.

6. A fiber storage plate according to claim 4 wherein the base sections are provided with snap fitting means formed of at least one tab on one base section with a corresponding slot on the other base section.

7. A fiber storage plate according to claim 4 wherein the base sections are mounted a distance apart with the ring portions aligned opposite one another such that a fiber loop is secured in position in an oval configuration.

8. A fiber storage plate according to claim 1 wherein the base further comprises openings for lighting.

9. A fiber storage plate comprising:
   a) a base divided into two sections releasably held together,
   b) a stationary cylindrical ring extending outward from the base, with half the ring extending from one section and half from the other, wherein, when the sections are together, the ring forms a circle having a radius at least equal to the minimum EIA bend radius for an optical fiber, and
   c) at least one releasable fiber fastening means in each section, attached to and extending radially outward from the ring towards a base section associated with a said ring half so as to form an axially and radially enclosed fiber storage space so that fiber can be secured in position around the ring and adjacent to the base.

10. A fiber storage plate according to claim 9 wherein each base section has two fiber fastening means each comprising an arm movably attached to a said ring half by integrally molded hinges, wherein the arm releasably engages with a catch and a catch assist member on the base.

11. A fiber storage plate according to claim 9 wherein the fastening means comprises a latching clip on the ring that engages with a catch on the base.

12. A fiber storage plate according to claim 9 wherein the two base sections are held together by snap-fit engagement of a tab on one section with a corresponding slot on the other section.

13. A fiber storage plate according to claim 9 further comprising a mounting means.

14. A fiber storage plate according to claim 13 mounted with the base sections together so that the fiber is secured in a circular configuration around the ring.

15. A fiber storage plate according to claim 13 mounted with the sections a distance apart, with the open ends of the rings aligned opposite one another so that the fiber is secured in an oval configuration around the ring.

16. A fiber storage plate according to claim 13 wherein the mounting means is selected from the group consisting of screws and double-sided sticky tape.

17. A fiber storage plate comprising:
   a) a base divided into two sections releasably held together by snap-fit engagement of at least one tab on one section with a corresponding slot on the other section, each section having a mounting means,
   b) a cylindrical ring extending outward from the base plate and perpendicular to it, with half the ring extending from one section and half from the other, wherein, when the sections are together, the ring has a radius at least equal to the minimum EIA bend radius for an optical fiber, and
   c) two fiber latching clips hinged to the ring in each section and extending radially outward from it, which each comprise an arm that engages with a catch and a catch assist member on the base so that fiber can be secured in position adjacent to the base and around the ring in a circular configuration when the sections are mounted together and in an oval configuration when the sections are mounted apart and having the open ends of their ring halves aligned.

18. A fiber storage plate according to claim 17 wherein the base further comprises openings for lighting.

* * * * *